H. M. STRECKER.
THEFT PREVENTING AUTOMOBILE SIGNAL.
APPLICATION FILED SEPT. 19, 1919.
1,325,593.
Patented Dec. 23, 1919.
2 SHEETS—SHEET 1.
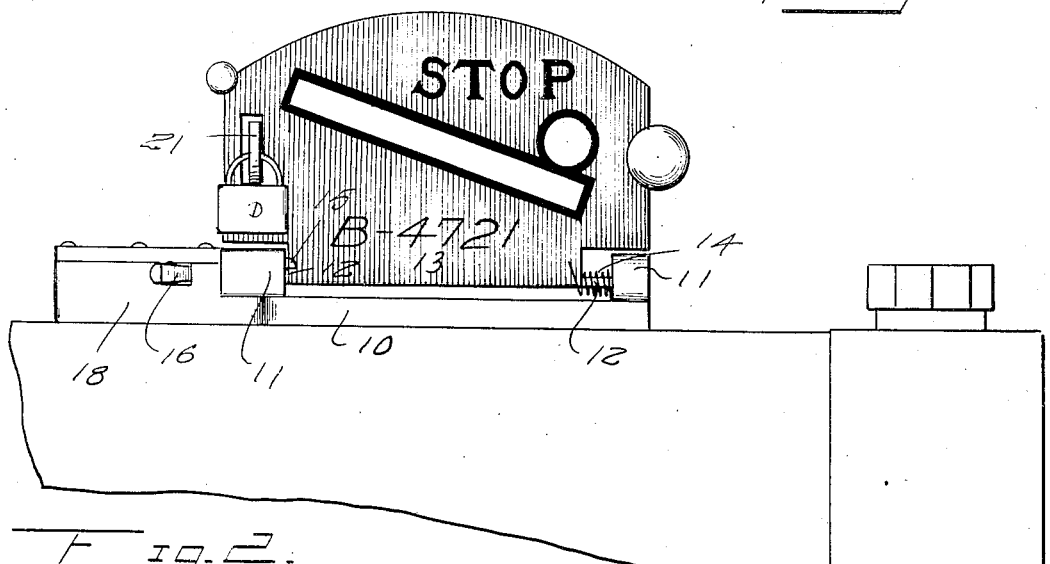
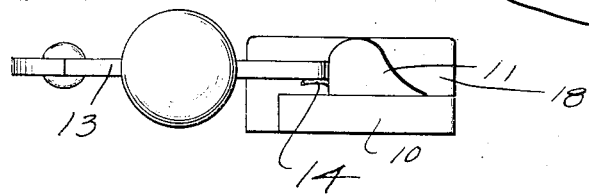
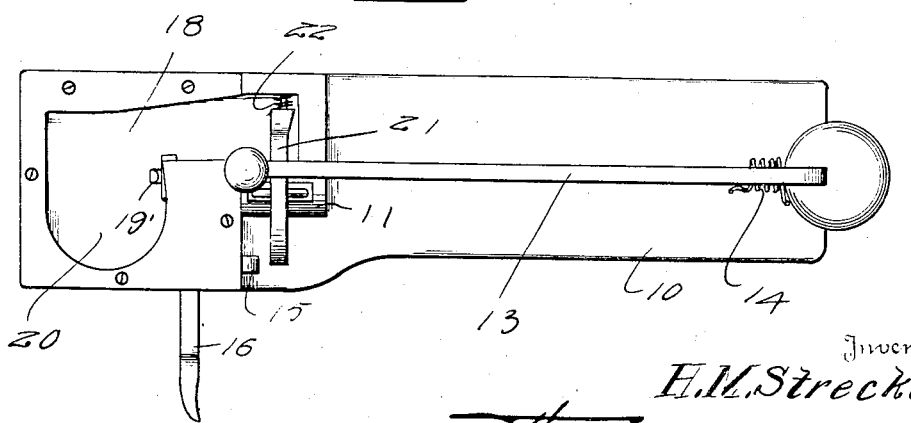
Inventor
H. M. Strecker
By Thomas R. Harney
Attorney H. M. STRECKER.
THEFT PREVENTING AUTOMOBILE SIGNAL.
APPLICATION FILED SEPT. 19, 1919.
1,325,593.
Patented Dec. 23, 1919.
2 SHEETS—SHEET 2.
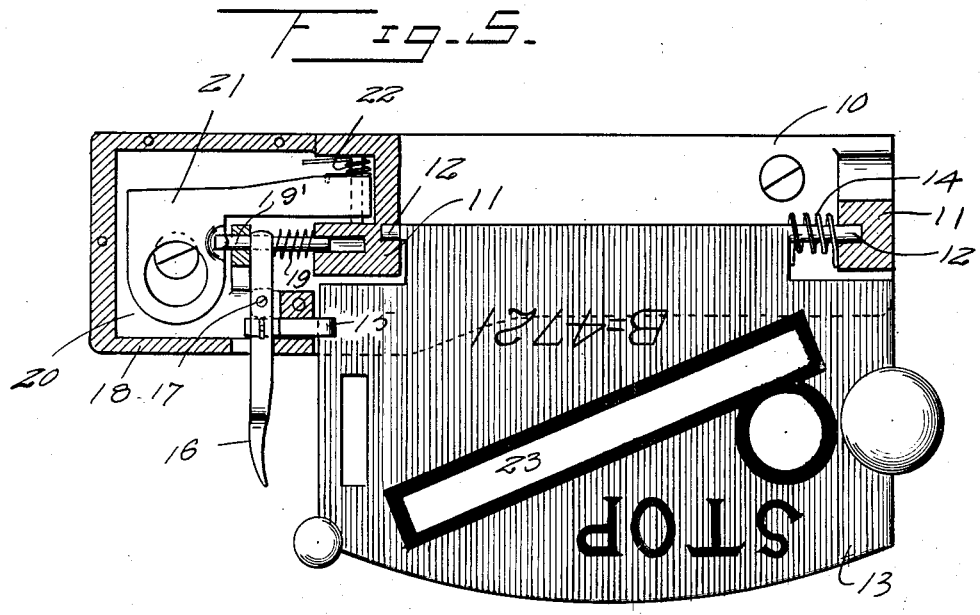
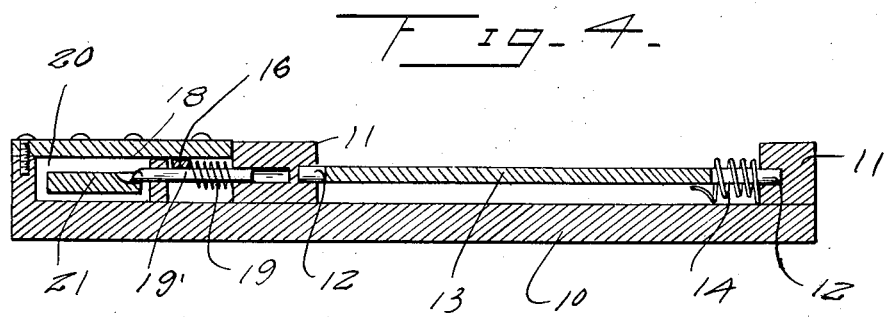
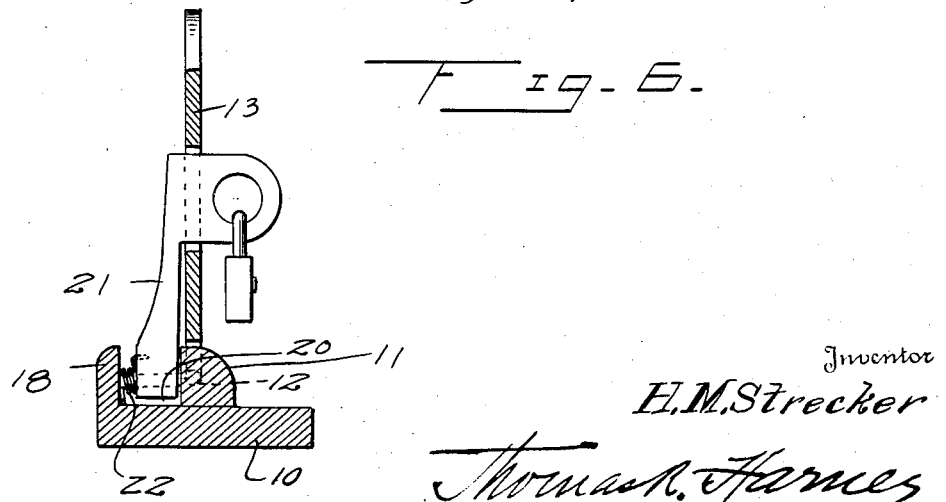
Inventor
H. M. Strecker
By Thomas R. Harnes
Attorney

UNITED STATES PATENT OFFICE.

HARVEY M. STRECKER, OF ARCADIA, KANSAS.

THEFT-PREVENTING AUTOMOBILE-SIGNAL.

1,325,593. Specification of Letters Patent. Patented Dec. 23, 1919.

Application filed September 19, 1919. Serial No. 324,900.

*To all whom it may concern:*

Be it known that I, HARVEY M. STRECKER, a citizen of the United States, and a resident of Arcadia, in the county of Crawford and State of Kansas, have invented certain new and useful Improvements in Theft-Preventing Automobile-Signals, of which the following is a specification.

My present invention relates generally to automobile signals and more particularly to a stop signal, my object being the provision of a simple inexpensive arrangement by means of which the owner of an automobile may, when leaving his car, place a signal, easily and conveniently in operative position to indicate the machine is not in use and to thus draw particular attention to the machine in case it is operated unwarrantedly during such position of the signal.

In completing this invention, it is proposed that no automobile shall be permitted to proceed under traffic rules while its safety stop signal is in the operative position and my invention contemplates the displaying of the signal in a prominent position on the machine so that in the normal inactive position, it will be unobserved, while plainly apparent in the operative position, and my invention further contemplates its display in such a manner that its movement from one position to the other may be readily and quickly accomplished.

In the accompanying drawing illustrating my present invention,

Figure 1 is a side view showing the practical application of my invention,

Fig. 2, is a front elevation showing the signal in the inoperative position,

Fig. 3 is a top plan view,

Fig. 4 is a central longitudinal section taken through the parts in the inoperative position, and Fig. 5 is a fragmentary horizontal section through the parts as shown in Fig. 4.

Referring now to these figures, my invention provides a base plate or support 10 having longitudinally spaced bearings 11 in which the projecting trunnions 12 at the lower or inner edge of the signal plate 13 are journaled so that the signal plate may be rocked from its vertical active or operative position, as seen in Fig. 1, to a horizontal inactive or inoperative position which it normally assumes, as seen in Figs. 2 and 3. One of the trunnions 12 is elongated and engaged by a spring 14 which also engages the adjacent bearing 11 and is of sufficient strength to rock the signal plate 13 from its inactive to its active position. The signal plate 13 is normally held in lowered inactive position by means of the projecting pin 15 extending from a lever 16 at one side of the fulcrum of the said lever and beneath which pin the adjacent edge of the signal plate 13 is shiftable. The lever 16 is fulcrumed at 17 in a housing 18 at one end of the base or supporting plate 10 and is controlled by a spring 19 which serves to hold the lever in its active position with its pin 14 engaging the signal plate 13 to hold the latter in inactive position.

At the opposite side of its fulcrum, with respect to the pin 15, lever 16 has a second pin 19 projecting in a relatively opposite direction and into an enlarged cut out portion of the housing which forms a cavity 20 conformable to the shape of a signal plate supporting and locking arm 21. This arm 21 is pivoted in a portion of the housing 17 adjacent to the nearest of the two bearings 11 and is arranged to swing in a vertical plane at right angles to the plane of swinging movement of the signal plate 13. The arm 21 is controlled by a spring 22 which serves to elevate the same to the vertical active position shown in Fig. 1 and its spring 22 is of materially greater strength than the actuating spring of the signal plate 13.

Thus upon shifting movement of the lever 16, serving to simultaneously release the locking arm 21 and the signal plate 13, the relatively stronger spring of the locking arm will thrust the same to its vertical active position in the path of vertical swinging movement of the signal plate.

As will be noted from Fig. 1 in particular, the locking arm 21 has an upper lateral projection for the reception of which the signal plate has a transverse slot adjacent to one end, the lateral projection 22 of the arm being provided with an aperture to receive a lock, so that the signal plate may be secured in upper active position.

By reference to Fig. 1, again, it will be noted that the signal plate is of a solid single color with the word "Stop" prominently displayed in a different color as well as the serial letter and number of the car. The signal plate is flat and in order that attention may be called to its disposition in active position, its forward edge preferably has a spherical or rounded enlargement of a different color from that of the body of the plate. Furthermore, in view of the fact that it might be difficult under some circumstances to see the signal plate against the background of the body plate, I preferably provide the signal plate with slots or openings 23 having a border therearound of a different color from that of the body of the plate.

Thus, the signal plate when in the active position will be distinctively and prominently displayed, so that any one viewing the machine in motion will know that that particular machine should not be in motion, and has been left by the rightful owner. In this way, traffic officers will be placed upon notice to investigate.

In the use of the device, the owner or the rightful operator of an automobile, when leaving his machine simply shifts the lever 16 to release both the signal plate and locking arm which then assume the operative position shown in Fig. 1 from the effect of their actuating springs. The operator then secures the signal in the effective position by passing the shank of a lock through the opening 22 of the locking arm and when reentering the machine, the lock is first removed and the signal plate and locking arm shifted to inactive position, shown in Fig. 2.

I claim:—

1. In a signal, a substantially flat support, a signal plate mounted thereon to swing from a horizontal concealed position to a vertical exposed position, means to hold the signal plate in its vertical effective position, said means coöperating with the signal plate to receive a lock for the purpose described.

2. In a signal, a substantially flat support, a signal plate mounted thereon to swing from a horizontal concealed position to a vertical exposed position, means to hold the signal plate in its vertical effective position, said holding means being movable with respect to the support, and means for normally retaining the said holding means and the signal plate in lower inactive position.

3. A signal comprising a substantially flat support having a recessed upper face, a signal plate and a signal plate holder normally concealed with the recesses of the support and movably connected thereto, said plate and its holder having relatively engaging portions which abut when the plate and holder are in vertical, active position and which coöperate to receive a lock for securing the signal plate in the last mentioned position, as described.

4. An automobile signal of the character described, comprising a supporting plate, a vertically swinging signal plate mounted on the supporting plate, manually releasable latching means for normally holding the signal plate in horizontal inactive position, and means for locking the signal plate in its vertical active position as described, said last named means including a locking arm mounted to swing on the support at right angles to the plane of swinging movement of the signal plate and normally assuming a horizontal inactive position with the signal plate.

5. The combination of a hinged vertically swinging signal member, a locking arm mounted to swing in a plane at right angles to that of the signal member and engageable with the latter in its vertical operative position, and means normally engaging and holding the said signal member and its locking arm in horizontal inactive position as described.

6. An automobile signal comprising a supporting member, a signal member hinged on the supporting member to swing vertically, a locking member also hinged on the supporting member to swing vertically and engageable with the signal member in the vertical active position of the latter, latch means mounted in connection with the supporting member and normally engaging and holding the signal member and the locking member in horizontal inactive positions, and springs for shifting the signal member and the locking member to active positions when said latch means are released.

7. An automobile signal comprising a supporting member, a signal member hinged on the supporting member to swing vertically, a locking member also hinged on the supporting member to swing vertically, and engageable with the signal member in vertical active position of the latter, latch means mounted in connection with the supporting member and normally engaging and holding the signal member and the locking member in horizontal inactive positions, and springs for shifting the signal member and the locking member to active positions when said latch means are released, said latch means including a lever having members engageable with the signal member and the locking member whereby the latter may be simultaneously released.

8. The combination of a vertically swinging signal plate normally positioned in a horizontal inactive position, means to support said plate in vertical active position including a vertically swinging member having its plane of movement at right angles to that of the signal plate, means to secure said member and said signal plate together in the active position, and means to normally hold said member in horizontal inactive position with the signal plate.

In testimony whereof I affix my signature.

HARVEY M. STRECKER.